INVENTOR
Thomas Stuart
ATTORNEYS

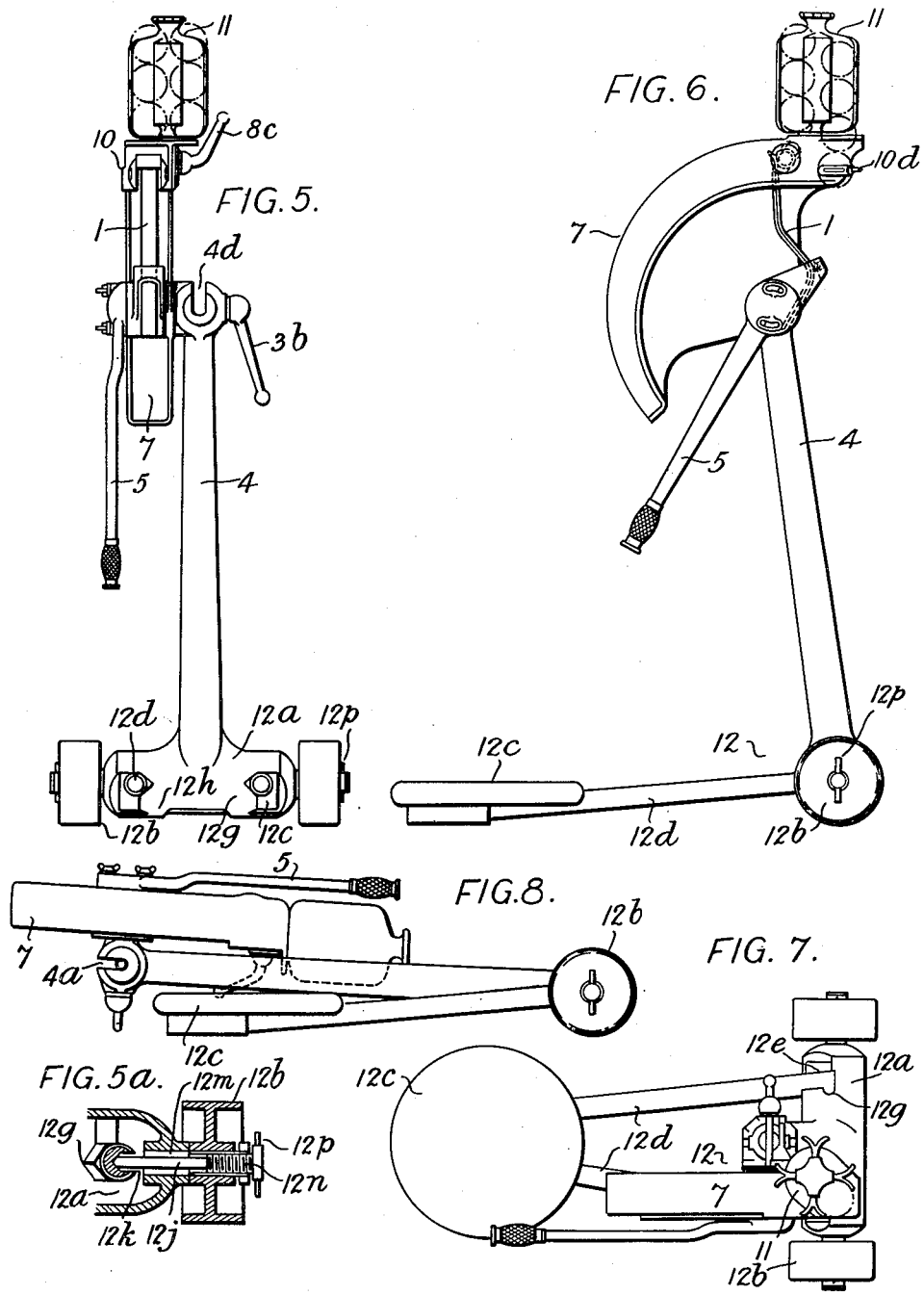

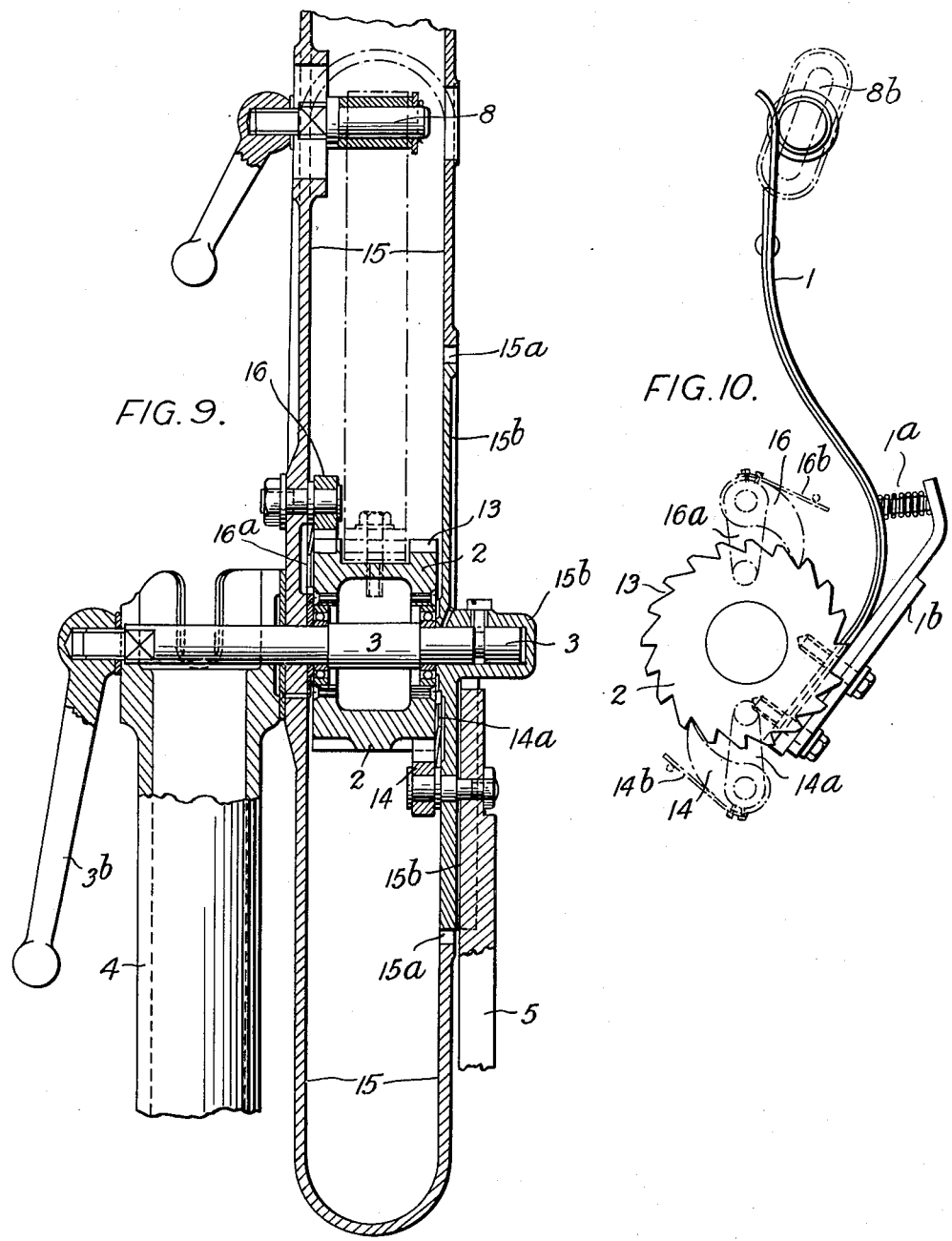

Patented June 14, 1932

1,863,035

UNITED STATES PATENT OFFICE

THOMAS STUART, OF ERDINGTON, BIRMINGHAM, ENGLAND, ASSIGNOR, BY DIRECT AND MESNE ASSIGNMENTS, OF ONE-HALF TO DUNLOP RUBBER COMPANY LIMITED, OF BIRMINGHAM, ENGLAND, A BRITISH CORPORATION, AND ONE-HALF TO JEAN RENE LACOSTE, OF SYLVESTERE, COURLEVAIE, SEINE, FRANCE

PROPELLING APPARATUS APPLICABLE PARTICULARLY TO THE PROPELLING OF LAWN TENNIS BALLS AND OTHER GAME MISSILES AND THE LIKE

Application filed December 27, 1929, Serial No. 416,868, and in Great Britain January 1, 1929.

This invention relates to apparatus for propelling lawn tennis balls and the like of the kind wherein a rotatable blade spring is provided which meets in its rotation a stop which cocks it, wherein the ball is supported a certain distance from said stop, and wherein when said spring escapes it strikes the ball so as to project it.

The object of the invention is to simplify and improve such apparatus both as regards construction and use.

According to this invention I provide apparatus of the kind described wherein the spring is carried or operated by a rotary bush or the like mounted upon a stationary spindle or the like, said bush being rotated by a handle or the like, either directly or alternatively through free wheel mechanism.

Various other features or provisions of my invention will become apparent as the description proceeds.

In the accompanying drawings:—

Figures 3 and 4 are plan views of certain details of the said head part of the apparatus.

Figures 5, 6 and 7 are respectively end, side and plan views of the complete apparatus according to the preferred embodiment of my invention.

Figure 5a is a cross sectional view of a detail of Figure 5.

Figure 8 is a side view showing said apparatus collapsed as for transport.

Fig. 9 is a vertical sectional view of a modified form of the invention and Fig. 10 is a detail side view of a portion of a modified form of the invention.

Figure 1:
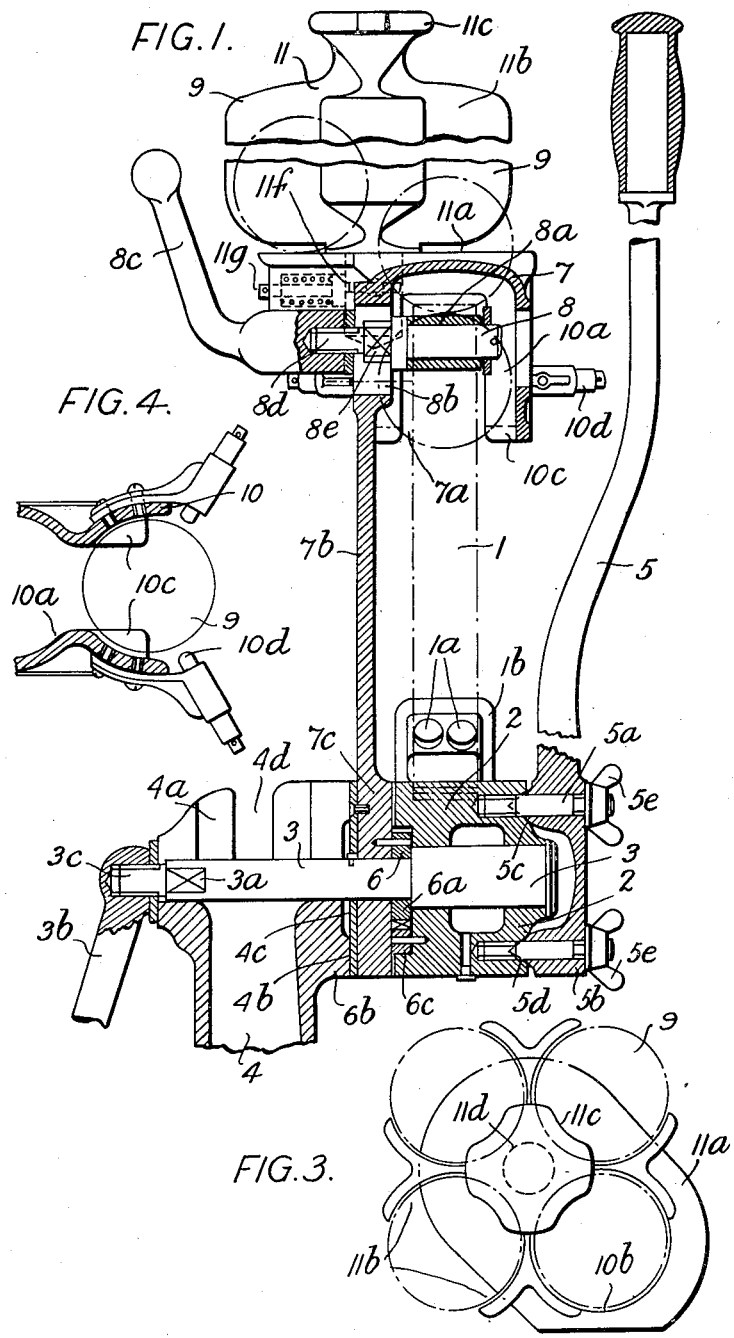
Figure 1 is a cross sectional view of the head part of apparatus, constructed according to the preferred embodiment of my invention, adapted for the projection of lawn tennis balls to a person practising the strokes of the game.

Figure 1 shows a blade spring 1 carried by a bush 2 rotatably mounted upon a stationary spindle 3 supported by the tubular standard of the apparatus 4, said bush 2 being rotated by a handle 5 which it carries.

There is also provided non-return ratchet mechanism 6 comprising firstly a ratchet wheel 6a fixed rigidly to a part 6b of the head which is stationary when the apparatus is in operation, and secondly a pawl 6c carried by a bush 2. This mechanism functions to hold the handle 5 in a position of ready accessibility, preventing said handle swinging to the bottom position and continuing to swing there; said pawl also prevents the handle being rotated in the wrong direction with consequent damage to the spring—further it functions as a safety device obviating the possibility of the handle swinging back violently should it inadvertently be released while loading the spring.

A guard 7 having a channel-shaped edge 7a is provided as shown to enclose part of the travel of the spring, said guard being supported upon the spindle 3 by one edge 7b of said channel 7a being extended towards said spindle and carrying a boss 7c fitting thereon.

The stop whereby the spring is loaded or cocked comprises a spindle 8 which is carried by the guard 7 so as to project transversely across the channel 7a thereof into the part of the spring 1. The spindle 8 may carry an anti-friction roller 8a.

The balls 9 to be propelled are positioned successively at the end of a guide 10 formed integral with the guard aforesaid by shaping the said guard as shown at 10a, said balls being fed to the guide through a hole or outlet 10b in the top of said guard.

The lower end of this guide is formed into a lip 10c adapted to support the lowest ball and spring loaded plungers 10d are provided as shown, correctly to align the ball in said guide and lip.

In operation the handle 5 is rotated and so directly rotates the spring 1. Said rotation is resisted by the stop 8 and thereby said spring is deflected and loaded. Finally the deflection is such that the spring presses past the stop, and so, assuming its normal formation, flicks violently into contact with the ball to project the same. The operator then throws the handle forward, which more or less amounts to allowing it to follow through, and it swings loosely round and is held at the height of its swing back by the non-return ratchet mechanism 6.

Having given an outline of the preferred form of apparatus and its functioning, I will now describe various features and some detail.

A magazine 11 is in communication with the guide 10 said magazine being seated on a platform 11a integral with the guard 7. As shown in the drawings said magazine comprises four vertical chambers 11b, each carrying three balls one above the other, the whole magazine being rotatable by a grip 11c, bodily about a central bearing 11d, so that the chambers are successively aligned with the outlet 10b which passes through the platform 11a. The bearing 11d comprises a hole 11e in the platform 11a into which hole fits a spindle extension 11f of the magazine 11. Lightly to lock the magazine in its various positions a spring loaded plunger 11g is provided which engages appropriately spaced depressions on the extension 11f. This detent is also the anchorage for the magazine, the latter being readily removable as to discourage promiscuous use of the apparatus, merely by pulling back the plunger 11g, the magazine being then bodily removable.

The spring 1 may be associated with damping provision; as shown in the drawings, the same comprises making the spring 1 laminated and providing small helical springs 1a acting in compression between the propelling spring 1 and the bracket 1b carried by the bush 2.

Provision is made to vary both the speed and the trajectory of the projected ball—to vary the speed, the stop 8 is mounted in a slot 8b so as to be movable into the rotational part of the spring 1 to a greater or lesser degree, thereby to vary the deflection and loading of the spring and consequently the force with which it strikes the ball when it escapes. To lock the stop in position I provide a handle 8c which co-acts with a screwed extension 8d of the spindle 8 as shown in Figure 1, the spindle 8 having an annular part 8e which fits to the slot 8b so as to prevent rotation of the spindle 8 while tightening. A friction washer 8f may be provided if desired.

To vary the trajectory of the ball the guard 7, together with the whole head, is rotated bodily about the axis of the spindle 3, so that the ball starts its flight from a different position in relation to the floor.

It is a feature of the invention that the spindle 3 functions also to lock the head in position—as shown in the drawings, particularly Figure 1, the guard 7 is carried by the spindle 3 as already described and the boss 7c is a loose fit thereon, said spindle 3 is mounted in a slot 4a in the standard 4 and has an angular face 3a to prevent it rotating therein. To effect the clamping there is a handle 3b which co-acts with a screw extension 3c of the spindle 3 so as to clamp the said spindle rigid, and also to clamp the boss 7c of the guard 7 rigidly against the face 4b of the standard 4. A friction washer 4c may be provided if desired.

Figure 2:
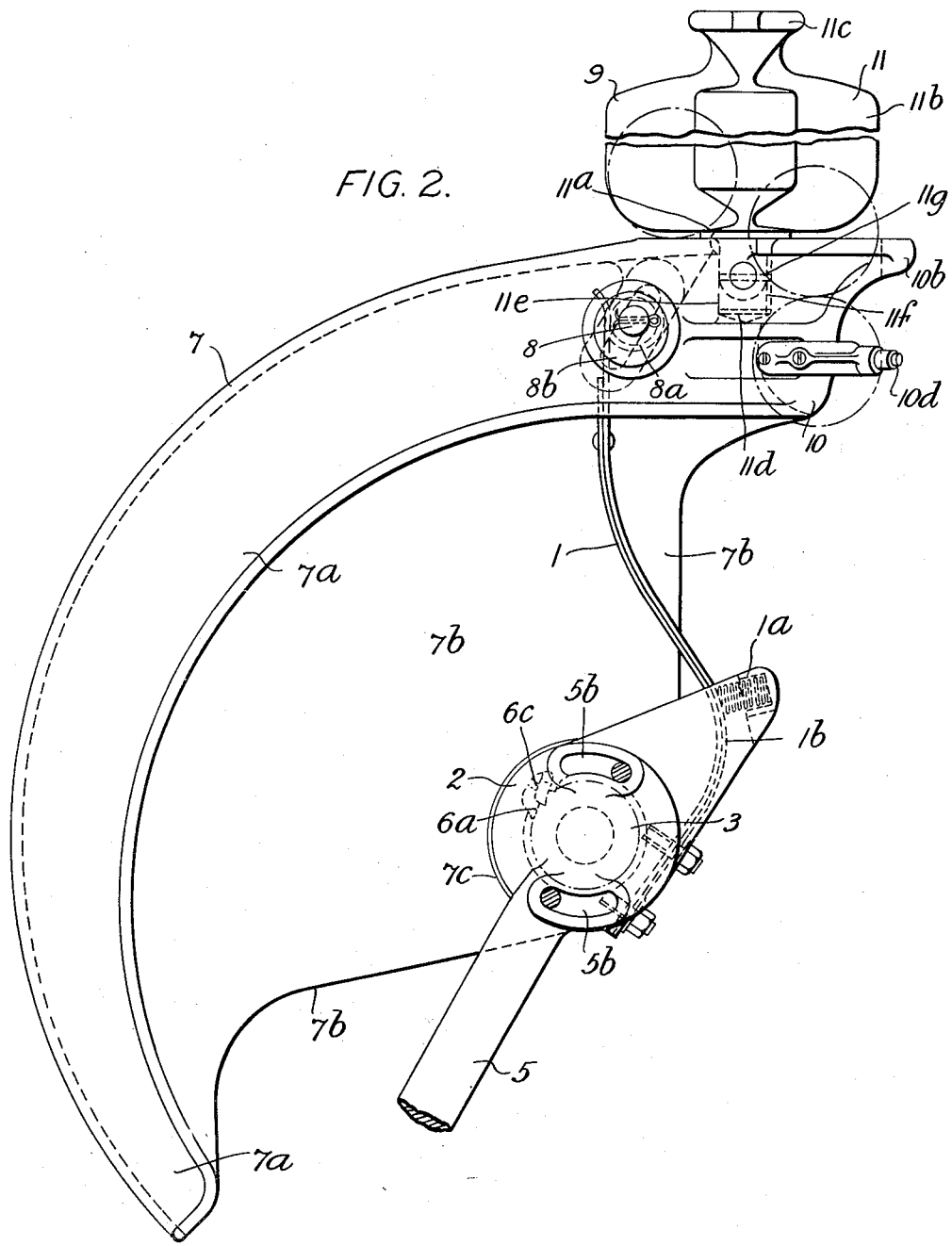
Figure 2 is a side view of Figure 1.

So that the handle 5 may always swing back into a comfortable position of ready accessibility irrespective of the angle to which the guard 7 is adjusted for trajectory, the position of said handle in relation to the bush 2 is adjustable—as shown particularly in Figures 1 and 2 it is retained on said bush by a pair of studs 5a fixed in the bush and which pass through slot 5b in the handle, a double taper connection 5c, 5d being made between said handle and said bush. In this way the handle may be fixed to the bush in a plurality of positions along said slots—the clamping means being wing nuts 5e so that the handle may be readily tightened or loosened as desired.

As shown in Figures 5, 6 and 7 the standard 4 is associated with a wheeled carriage 12 comprising firstly a foot 12a carrying the wheels 12b and extending across the end of said standard integral with it, and secondly a platform 12c connected to the said foot 12a by converging side members 12d. To facilitate movement of the apparatus say about a lawn tennis court handles may be provided or the guard 7 may be so adapted or disposed as to provide facility for handling.

For purposes of transport and storage the apparatus is adapted to collapse into a comparatively small compass. Referring to Figure 8 the standard 4 is pivotal on the base 12c, 12d, so as to swing closely against the same, while the guard 7 and associated parts is removable from the slot 4a and securable, in a further slot 4d in the standard, the slot 4d being at a right angle to the slot 4a, that is, co-incidental with the aforesaid platform.

The locking provision for the standard 4 on the base 12c, 12d is shown in Figures 5, 5a and 7 and comprises two specially shaped slots 12e in the foot 12a, said slots each having two spaced notches 12g and 12h, adapted to co-act with the members 12d in the operating and collapsed positions respectively. Screwed pins 12j are provided to anchor said members in said notches, said pins engaging sunken holes 12k in the end of the members 12d. The pins contact the bottom of the holes 12k for locking purposes, but even in collapsing never entirely leave the holes or otherwise the foot 12a would no longer be anchored to the base 12c, 12d. The bearings for the wheels 12b are tubular spigots 12m fixed in the foot 12a and the pins 12j pass through spigots being screw threaded in them as shown at 12n.

In the vertical or operating position of the standard 4 the foot 12a is held by the engagement of the members 12d with the notches 12g, the pins 12j locking said members firmly therein. In collapsing, the pins 12j are loosened with the aid of the grip 12p, the standard 4 is folded towards the base 12c, 12d and the foot 12a by means of the slots 12e, forces the members 12d apart against their own springiness, until the position shown in Figure 8 is reached, when the said members spring back into the notch 12h, Figure 5. The pins 12j are then tightened on the standard and base which are thereby held firmly together in the collapsed position.

It should be understood that I do not confine myself to precisely the foregoing arrangement, as for example of the bush 2 being rotated directly by a handle fixed to it, alternatively said bush may be rotated by a similar handle mounted independently of it and operating it through free wheel mechanism.

Referring to Figures 9 and 10, which illustrate one arrangement of such a scheme here the bush 2 is provided with ratchet teeth 13 and is rotated by a driving pawl 14 carried by the handle 5 which is supported on the spindle 3 independently of the bush 2.

In the arrangement shown the guard (7 in the other scheme) comprises a cover 15 which completely encloses the various moving parts such as the propelling spring and its free wheel operating mechanism, said cover having a circular assembly opening 15a closed by a cap 15b which is rotatably mounted upon the spindle 3, as shown in Figure 9, said cap carrying the operating handle 5.

The non-return mechanism (6 in the other scheme) comprises in this instance a pawl 16 carried by the cover 15, said pawl functioning to lock the bush 2 while the operating handle 5 is being moved backwardly into the most convenient position from which to start the loading rotation.

Provision may be made to eliminate pawl noise, the pawls being associated with small blade springs 14a and 16a respectively which frictionally engage the side faces of the bush to lift the pawls clear of the ratchet teeth during rotation thereof—the pawls are caused normally to engage said teeth by the springs 14b and 16b respectively.

The remainder of the arrangement and the various provisions are substantially as in the first embodiment except for details such as the bush being mounted as shewn in Figure 9 on ball bearings, and it will be apparent that details such as this may be common to both schemes.

Operation of the alternative arrangement is as follows:—

In use, the spring 1 having been positioned as hereinafter set forth closely adjacent the stop 8, the operating handle 5 is rotated, through say thirty degrees, thereby to rotate the bush and the spring. As before the spring is thereby cocked and subsequently released to project the ball. That done, the spring, by virtue of its surplus energy, continues its rotation until it meets the starting side of the stop 8. Said spring is retained closely adjacent said stop ready for the next operation, that is said spring is prevented from rotating loosely back, by either or both of the pawls 14, 16.

For the next operation the handle 5 is rotated backwardly to a comfortable and efficient position from which to start forward, or loading, rotation—the non-return pawl 16 meantime restraining the ratchet against rotation with said handle,—and the motions set out in the next preceding paragraph are repeated.

Other alternative details include the following:—

While the provisions of my invention allow me to use only one propelling spring and still to achieve particularly speedy operation, I may alternatively use a plurality of springs radially arranged. Preferably however I utilize only one as in this way I obviate any possibility of variation in projection due to variation in different springs; and of course cost is reduced.

Again the magazine may be a single chamber such as a tube or a hopper rigid with the guard. Or the chambers 11b may be adapted to take more than three balls.

Again I may operate the spring through suitable gearing. And the apparatus may be driven by power means.

Again in the free wheel operating scheme I may use a free wheel of the type comprising concentric rings with engaging members disposed between them.

Again I may make provision to impart spin or rotation to the ball as it is projected—it may be caused to contact parts interposed slightly into its trajectory or the propulsion member may strike it out of centre either or both laterally or vertically.

And finally, for the purpose of readily altering the direction of flight of the balls, the head may be mounted so as to be rotatable about the vertical axis of the standard or the standard may be similarly mounted in relation to the base.

What I claim is:

1. Apparatus for propelling tennis balls comprising a supporting head, a spindle, a spring mounted for rotation about the axis of said spindle, said spindle comprising means to lock the head of the apparatus in position when tightened in its mounting and to free the head so that said head can be moved bodily around the spindle for the purpose described when said spindle is loosened.

2. Apparatus of the type described which comprises a channel shaped curving guide, means for rotating the free end of a spring in said guide, means for placing a tennis ball in the path of said spring, a stop for restraining said spring in advance of said guide, a handle for rotating said spring, and means for adjusting the position of said handle relative to said spring.

In witness whereof, I have hereunto signed my name.

THOMAS STUART.